United States Patent
Janardhanan et al.

(10) Patent No.: US 9,299,243 B2
(45) Date of Patent: Mar. 29, 2016

(54) SYSTEM AND METHOD OF ALERTING CMS AND REGISTERED USERS ABOUT A POTENTIAL DURESS SITUATION USING A MOBILE APPLICATION

(71) Applicant: Honeywell International Inc., Morristown, NJ (US)

(72) Inventors: Shaiju Janardhanan, Bangalore (IN); Hemanth Pv, Bangalore (IN); Ravikumar Vemagal Aswath, Bangalore (IN); Deepak Sundar Meganathan, Bangalore (IN); Vinay Hegde, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 86 days.

(21) Appl. No.: 14/173,048

(22) Filed: Feb. 5, 2014

(65) Prior Publication Data
US 2015/0221209 A1    Aug. 6, 2015

(51) Int. Cl.
| G08B 13/00 | (2006.01) |
| G08B 25/00 | (2006.01) |
| G08B 25/10 | (2006.01) |
| G08B 13/196 | (2006.01) |
| H04N 7/18 | (2006.01) |

(52) U.S. Cl.
CPC ........ *G08B 25/008* (2013.01); *G08B 13/19645* (2013.01); *G08B 13/19656* (2013.01); *G08B 25/10* (2013.01); *H04N 7/181* (2013.01)

(58) Field of Classification Search
CPC ................... G08B 13/19645; G08B 13/19656; H04N 7/181
USPC .............................. 340/541, 506, 937; 348/143
See application file for complete search history.

(56) References Cited

U.S. PATENT DOCUMENTS

| 7,019,671 | B2 * | 3/2006 | Kawai ............................ 340/937 |
| 7,253,732 | B2 * | 8/2007 | Osann, Jr. ...................... 340/541 |
| 7,423,529 | B2 * | 9/2008 | Singer et al. .................. 340/541 |
| 8,618,934 | B2 * | 12/2013 | Belov et al. ................. 340/539.3 |
| 2005/0245229 | A1 | 11/2005 | Brown et al. |
| 2010/0283609 | A1 * | 11/2010 | Remer ........................... 340/541 |
| 2012/0106782 | A1 * | 5/2012 | Nathan et al. .................. 340/541 |

FOREIGN PATENT DOCUMENTS

WO    WO 2008/145134 A1    12/2008

OTHER PUBLICATIONS

Combined Search and Examination Report for corresponding GB patent application GB1501347.7, dated May 14, 2015.

* cited by examiner

*Primary Examiner* — John T Tweel, Jr.
(74) *Attorney, Agent, or Firm* — Husch Blackwell LLP

(57) ABSTRACT

A system is provided that includes a security system that protects a secured area, a wireless portable device that arms and disarms the security system through a wireless interface, the wireless portable device having a camera, a microphone and a global positioning system (GPS), and a processor of the wireless portable device that detects disarming of the security system by a user under duress through the wireless portable device and captures information of an environment of the wireless portable device from the GPS and one or more of the camera and microphone and sends the captured information to a central monitoring station of the security system through the wireless interface.

20 Claims, 3 Drawing Sheets

SYSTEM AND METHOD OF ALERTING CMS AND REGISTERED USERS ABOUT A POTENTIAL DURESS SITUATION USING A MOBILE APPLICATION

FIELD

The field relates to security systems and more particularly to methods and apparatus for remotely controlling security systems.

BACKGROUND

Security systems are generally known. Such systems are typically used within homes or businesses to detect threats to the safety and/or assets of persons authorized to use the area.

Such systems typically include a number of sensors placed within the secured area. The sensors may include fire detection devices, gas detection devices, intrusion detectors or any combination of such devices.

The sensors may be monitored by a control panel located within the secured area or in some other area. Upon detection of a threat, the control panel may sound the local audible alarm and send an alarm message to a central monitoring station.

The control panel may be used in conjunction with a user interface that is located near an entrance to the secured area. The user interface may be used by an authorized user of the secured area to arm and disarm the security system.

Recent developments have included the use of an Internet interface to the control panel that allows a remotely located user to arm or disarm the security system. While such systems work well, they can be misused. Accordingly, a need exists for better methods for monitoring the use of such systems.

DETAILED DESCRIPTION OF AN ILLUSTRATED EMBODIMENT

Figure 1:
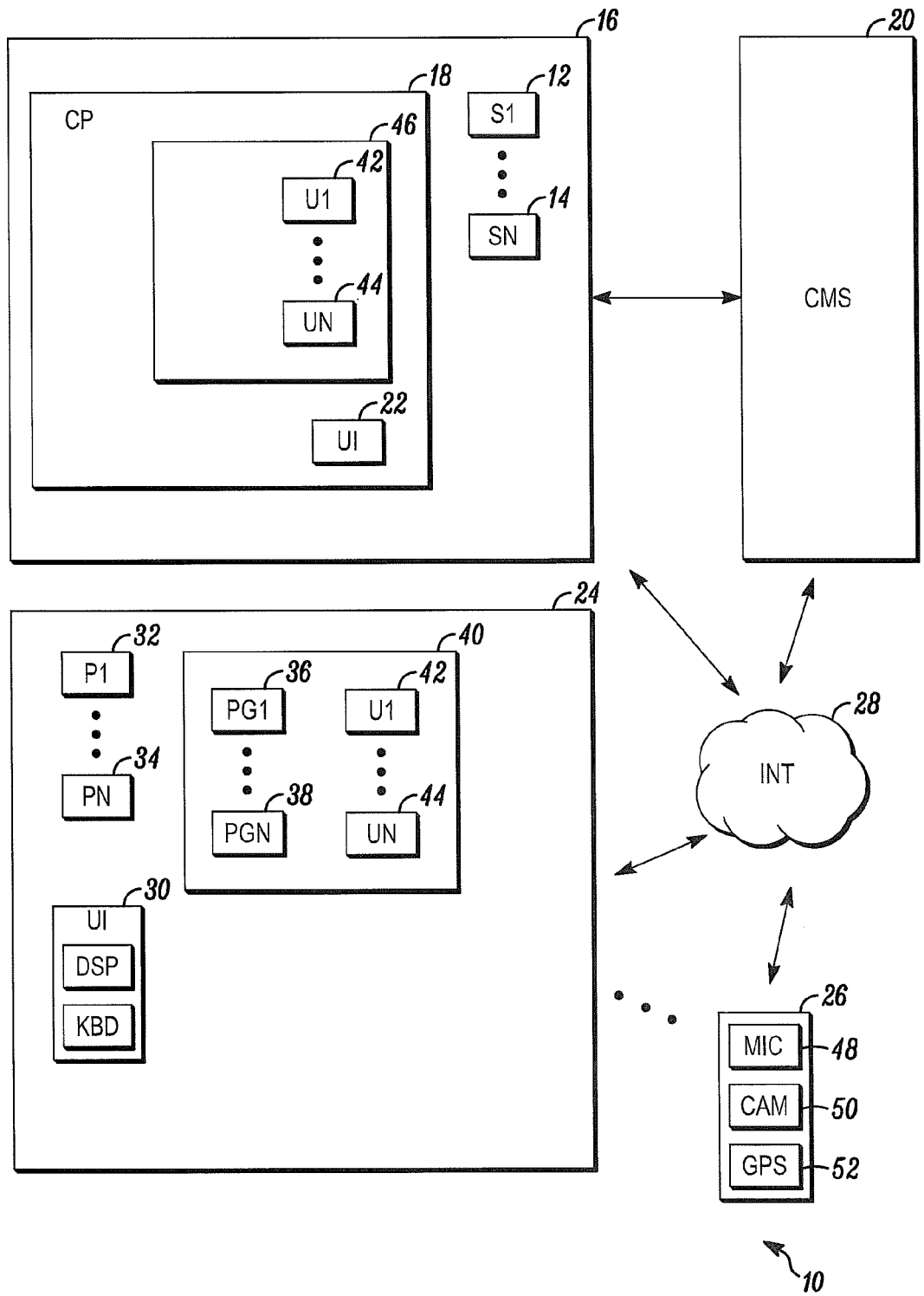
FIG. 1 is a simplified block diagram of a security system shown generally in accordance with an illustrated embodiment.

While embodiments can take many different forms, specific embodiments thereof are shown in the drawings and will be described herein in detail with the understanding that the present disclosure is to be considered as an exemplification of the principles hereof, as well as the best mode of practicing same. No limitation to the specific embodiment illustrated is intended.

FIG. 1 is a block diagram of a security system 10 shown generally in accordance with an illustrated embodiment. Included within the system are a number of sensors 12, 14 used to detect threats within a secured area 16. The secured area may be defined by the periphery of a home or business.

The sensors may be based upon any of a number of different technologies. For example, some of the sensors may be limit switches placed on the doors or windows of the home or business. Other sensors may be motion detectors based upon PIR detection or upon cameras with video image processors that detect changes between adjacent frames captured by the camera.

Still other sensors may detect environmental threats within the home or business. For example, some of the sensors may be fire or smoke detectors. Other sensors may detect natural gas or carbon monoxide.

The sensors, in turn, are monitored by a control panel 18 either located within the secured area or in some other area. Upon detection of the activation of one of the sensors, the control panel may activate a local alarm and send an alarm message to a central monitoring station 20. The central monitoring station may, in turn, summon the appropriate help (e.g., police, fire department, etc.).

The security system may be controlled via a local user interface 22 located near an entrance to the secured area. In this regard, the security system may be armed or disarmed through the local user interface via an authorized user entering a personal identifier along with a function identifier entered through the user interface.

The security system may also be controlled via one or more wireless portable devices 24, 26. In this regard, a corresponding user interface 30 within each of the portable devices may operate to emulate the operation of the user interface within the secured area.

Located within each of the portable devices (and within the control panel and central monitoring station) is one or more processor apparatus (processors) 32, 34 each operating under control of one or more computer programs 36, 38 loaded from a non-transitory computer readable medium (memory) 40. As used herein, reference to a step performed by a computer program is also reference to the processor that executed that step.

Once armed, an alarm processor of the control panel may monitor each of the sensors. Upon detection of activation of a sensor, the alarm processor may activate the local alarm and compose an alarm message to the central monitoring station. The alarm message may include an identifier of the secured area, an identifier of the sensor and a time of activation.

The alarm processor may be controlled by a status processor. The status processor may be a state machine that assumes a state or status including one of armed away, armed stay or disarmed based upon input from an authorized user through one of the user interfaces.

In this regard, the alarm processor may monitor all or some of the sensors based upon the state of the status processor. For example in the armed away state, the alarm processor may monitor and report an alarm upon activation of any sensor. In the armed stay state, the alarm processor may only report activation of any environmental sensor or intrusion sensors along the periphery of the secured area. In the disarmed mode, the alarm processor may only report the activation of environmental sensors.

The status processor may receive inputs via an interface processor that authenticates users via a source and content of an input. For example, when an input is received from the user interface within the secured area, the interface processor may only require a personal identification number (PIN) of an authorized user and the activation of a function key (e.g., arm away, arm stay, disarm, etc.).

In this regard, a memory 46 of the control panel of the security system may include a separate user file 42, 44 containing a different PIN for each authorized user. In addition, each user may have a different level of authorization. For example, in the case of a home, the owner may have the highest level of authorization and be able to select any operating mode. In contrast, the children of the owner may have a lesser authorization that only disables the security system for a short time that allows the child to enter and leave the secured area without triggering an alarm.

The interface processor may also accept instructions from and return data to each of the wireless portable devices. In this regard, a corresponding mobile interface processor within the portable device may form a secure connection between the portable device and the control panel. This secure connection may be formed under any of a number of different formats (e.g., Total Connect™ by Honeywell Inc.) in such a way that the look and feel of the user interface within the secured area may be emulated on a corresponding user interface of the portable device.

Figure 3:
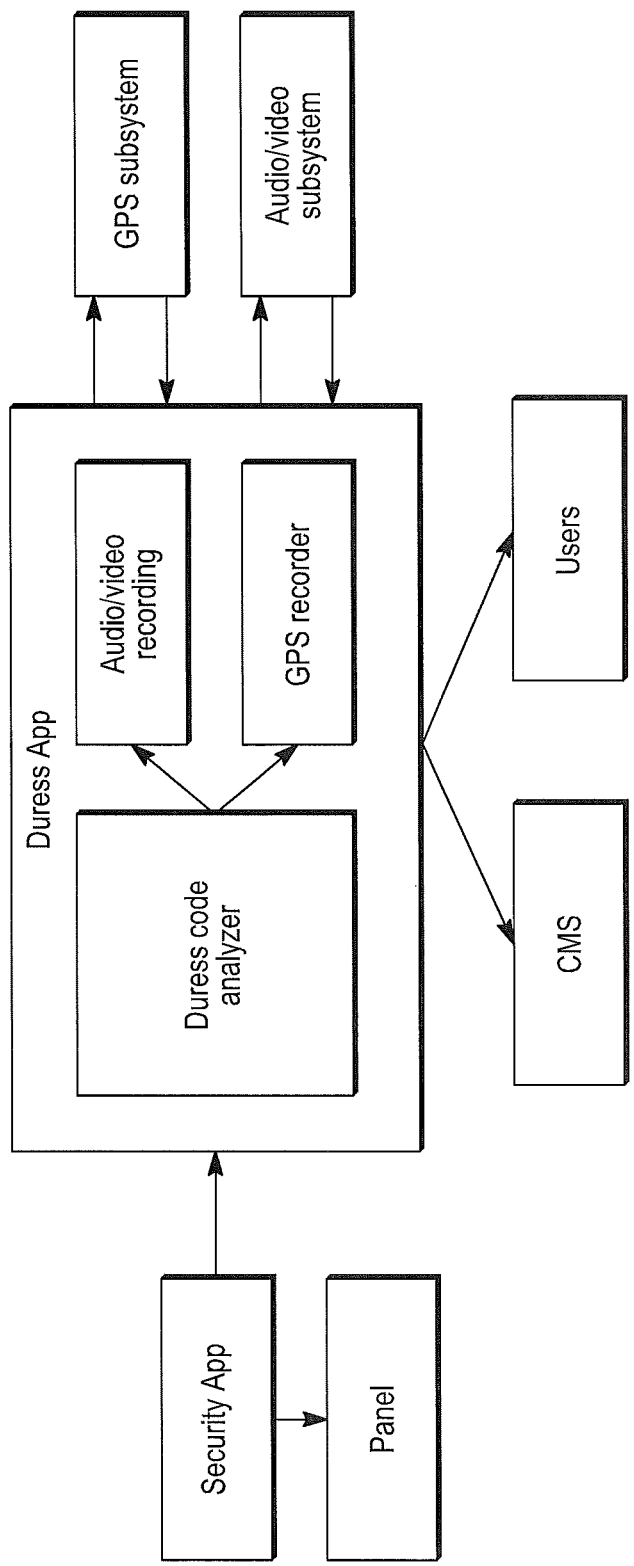
FIG. 3 depicts a particular architecture that may be used by the system of FIG. 1.

Under the illustrated embodiment, one or more of the wireless portable devices may include a duress reporting system that detects and reports use of the portable device to gain access into the secured area where the use is under duress. The duress reporting system may include one or more processors and corresponding software as shown in FIG. 3 executing on those processors.

The duress reporting system may be useful in situations where a user is forced to access or otherwise circumvent the security system under duress. For example, if an authorized user is coerced by a criminal into allowing access into the secured area (by disarming the security system), then the duress reporting system may detect the attempt to gain access and automatically report the attempt to the central reporting system and to other authorized users.

Under one particular embodiment, the duress reporting system may detect the existence of duress via a duress PIN entered through the user interface. In this case, the user file 42, 44 of each user may have a first and second PIN number. Entry of either PIN number may cause the status processor of the security system to accept and execute a function command in accordance with the authorization level for that user. In this case, the first PIN number may be a non-duress PIN number and the second PIN number is the duress PIN number. Entry of the first PIN number and function command causes the portable device and security system to operate conventionally. Entry of the second, duress PIN number causes the portable device to additionally collect information from the environment of the portable device and report that collected information to the central monitoring station.

In some embodiments, the portable devices may have two different disarm softkeys displayed on the screen. One disarm softkey is associated with normal operation and the other is associated with duress.

In this regard, each of the portable devices includes a microphone 48, one or more cameras 50 and a geographical positioning (e.g., a Global Positioning System (GPS)) device 52. Upon the detection of duress by the duress reporting system, the system collects information from one or more of these devices and from the geographical positioning device and sends the collected information to the central monitoring station.

The collected information may include at least a sequence of images of the user and environment around the user for a predetermined time period (e.g., 10 seconds) along with the geographic location of the user. A voice recording may also be included to further define the environment and cause of the duress. In the case of a portable device with a camera on both sides of the devices, images may be collected from both cameras for playback by security personnel and other authorized users.

In general, the duress reporting system may operate under any of a number of different formats. For example, a duress detection processor may operate in the background within the portable device to detect entry of a PIN and to compare the PIN with the list of pins within the user file. If a match between the entered PIN and duress PIN is detected, then the duress detection processor or a separate information collection processor may activate one or more of the microphone and camera(s) to collect information regarding the environment of the event.

Upon collection of the environmental information, a communication processor may compose a duress message addressed to an alerting processor within the central monitoring station. The alerting processor may display the collected information for the benefit of security personnel at the central monitoring station along with indication that the user may be using his/her portable device under duress. The alert may include an identifier of the portable device, an identifier of the authorized user and the geographical location from where the alert was initiated.

In addition to forwarding the collected information to the central monitoring station, a forwarding processor within the central monitor station may forward the duress message to one or more portable devices of other people authorized to control the security system. Alternatively, the communication processor of the originating portable device may forward the duress message directly to the other portable devices.

In other embodiments, components of the duress reporting system may be located within the control panel of the secured area and/or in the central monitoring station. For example, the duress detection processor may be located in the control panel and detect a duress PIN from that location. In this case, the duress detection processor may compose and send a message to the collection processor initiating the collection of information regarding the context of the duress.

In other embodiments, the duress detection processor may operate in conjunction with other components of the portable device to detect duress. For example, a voice recognition processor coupled to the microphone may detect words or phrases spoken in the vicinity of the portable unit. The voice recognition processor may compare the words with a word reference list in memory to detect words of threat spoken by other people in the vicinity of the authorized user. If the duress detection processor should detect both an attempt to access or control the security system and words of threat (within some predetermined time period), then the threat detection processor may initiate and send a duress report to the central monitoring station.

In other embodiments, the duress detection processor may detect duress and initiate the sending of a duress report based upon other factors. For example, the number of repeated attempts to change a security setting above some threshold value may indicate duress. Alternatively, the duress detection processor may retrieve weather conditions at the geographic location of the user. In this case, the detection of severe weather in conjunction with the user not changing his/her geographic location while also attempting to modify a setting of the security system may indicate duress. Similarly, the mere presence of the authorized user in a high crime area for a predetermined time period in conjunction with the user attempting to change a security system setting may indicate duress.

Figure 2:
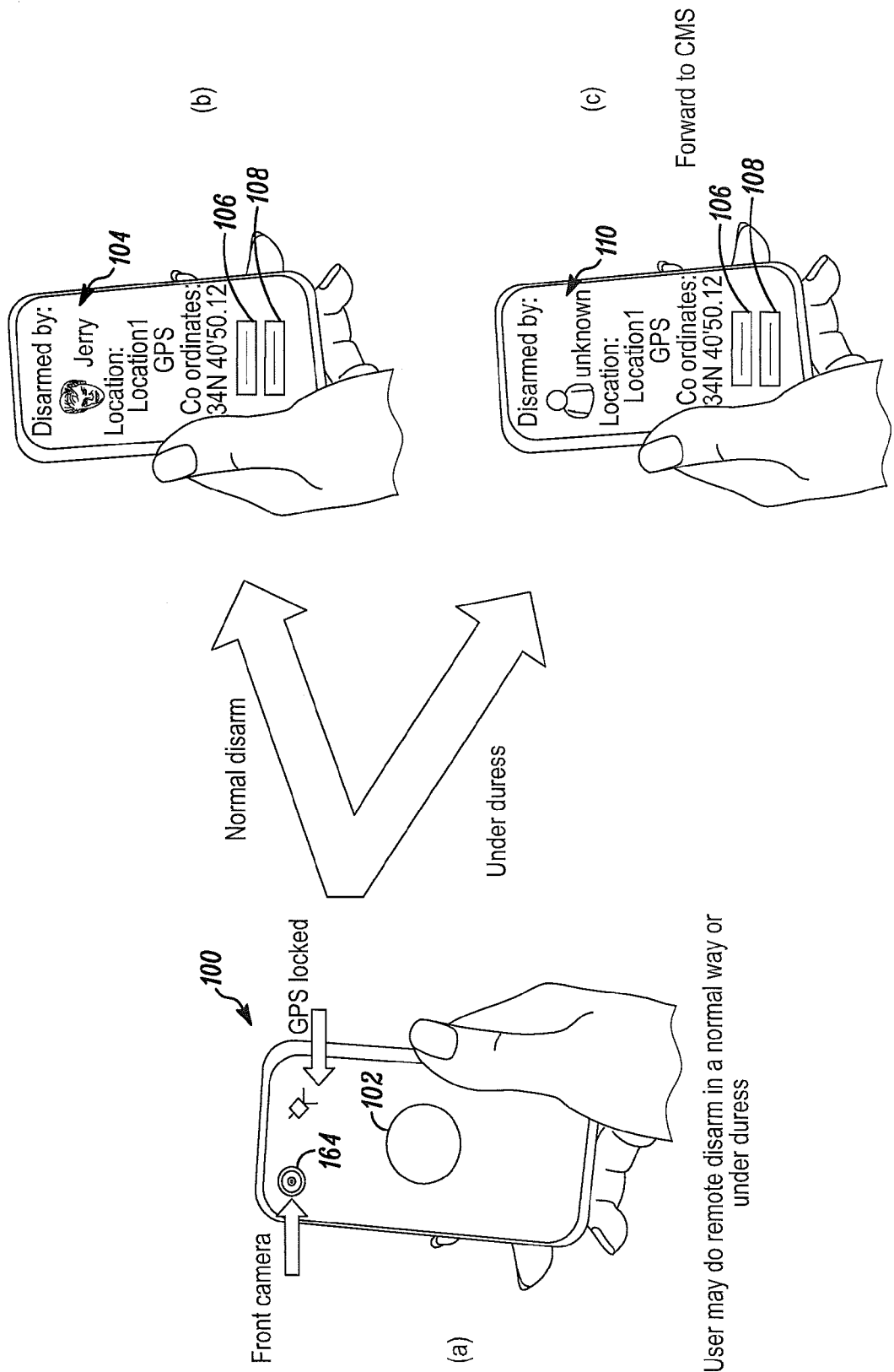
FIG. 2 depicts a set of display screens of a portable device used by the system of FIG. 1.

In another embodiment, an access report may be sent to the portable devices each time a security setting is changed as illustrated in FIG. 2. For example, FIG. 2a shows one of the portable devices of FIG. 1 (now identified by the reference number 100). The display of the portable device may include one or more disarm softkeys 102.

In this example, an image processor may use image recognition software to compare an image from a front camera 164 with an image of the authorized user saved in memory. In this case, once the user activates the disarm button 102, the duress detection processor may review the context of the disarm command including any one or more of the factors discussed above. The duress processor may also use an output from the face recognition software to analyze and determine the identity of the user. If the disarm command appears to be normal, then a disarm alert may be sent to each of the portable devices as shown in FIG. 2b. In this case, the alert may depict an image 104 of the user, the name of the recognized user, the coordinates of the user's location and a set of decision keys 106, 108. If another user decides that the disclaim looks suspicious, then that other user may activate a "FORWARD TO CMS" key 106 forwarding the alert to the central monitoring station. If not, then the user may activate an "IGNORE" softkey 108. If the alert is forwarded to the central monitoring station, security personnel may be automatically notified of the concern and may take the appropriate action.

If the duress detection processor cannot identify the user or detects duress using one or more of the factors discussed above, the alert of FIG. 2c may be sent to each user of the portable devices. In this case, the alert may include an image 110 of the unrecognized user, an indicator that the user was not recognized and the location of the portable device. If the other user recognizes the user, then that other user may activate the IGNORE softkey. If not, the other user may activate the FORWARD TO CMS softkey to forward the alert to the central monitoring station.

The duress reporting system may be useful in any of a number of different situations. For example, a criminal may hold a homeowner hostage at a remote location while coercing the homeowner to disable the security system on his/her home. At the same time, the criminal may send accomplices to burglarize the home of the owner once the security system is disabled.

In this case, the burglary may be thwarted by sending police to the home and to the location from which the duress report originated. In addition, the images and audio of the duress report may be used as evidence against the criminal(s) perpetrating the event.

In general, the security system includes a wireless portable device that arms and disarms the security system through a wireless interface, the wireless portable device having a camera, a microphone and a global positioning system (GPS) and a processor of the wireless portable device that detects disarming of the security system by a user under duress through the wireless portable device and captures information of an environment of the wireless portable device from the GPS and one or more of the camera and microphone and sends the captured information to a central monitoring station of the security system through the wireless interface.

Alternatively, the security system includes a wireless portable device with a wireless interface that arms and disarms a security system, the wireless portable devices having a user interface, a camera, a microphone and a global positioning system (GPS) and a processor of the wireless portable devices that detects disarming of the security system by a user under duress through the user interface, captures information of an environment of the wireless portable device from the GPS and one or more of the camera and microphone and sends the captured information to another wireless portable device through the wireless interface.

As a still further alternative, the system includes a security system, a plurality of wireless portable devices each with a wireless interface that arms and disarms a security system and each of the plurality of wireless portable devices having a user interface, a camera, a microphone and a global positioning system (GPS) and a processor of each of the wireless portable devices that detects disarming of the security system by a user under duress through the user interface, captures information of an environment of the wireless portable device from the GPS and one or more of the camera and microphone and sends the captured information to another of the plurality of wireless portable devices or a central monitoring station of the security system through the wireless interface.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A system comprising:
 a security system that protects a secured area;
 a wireless portable device that arms and disarms the security system through a wireless interface, the wireless portable device having a camera, a microphone and a global positioning system (GPS); and
 a processor of the wireless portable device that detects disarming of the security system by a user under duress through the wireless portable device and captures information of an environment of the wireless portable device from the GPS and one or more of the camera and microphone and sends the captured information to a central monitoring station of the security system through the wireless interface.

2. The system as in claim 1 further comprising a duress processor that detects duress by identifying a predetermined sequence of digits associated with disarming.

3. The system as in claim 2 further comprising a processor detecting the predetermined sequence of digits entered through a user interface of the wireless portable device.

4. The system as in claim 1 further comprising a word recognition processor and threat word file within a memory of the wireless portable device that detects threats by recognizing words or phrases spoken in the environment of the wireless portable device and by comparing the recognized words and phrases with a content of the threat word file.

5. The system as in claim 1 further comprising a threat processor that detects threats based upon a number of attempts made to disarm the security system.

6. The system as in claim 1 wherein the camera of the wireless portable device further comprises a camera on a front and a reverse side of the wireless portable device that are used to collect information about the environment.

7. The system as in claim 1 further comprising a processor that sends the captured information to at least one other authorized user of the security system.

8. The system as in claim 1 further comprising a recording processor that collects video and audio for a predetermined time period after detection of duress and a geographic location of the wireless portable device and sends the collected video and location to the central monitoring station.

9. A system comprising:
 a wireless portable device with a wireless interface that arms and disarms a security system, the wireless portable device having a user interface, a camera, a microphone and a global positioning system (GPS); and
 a processor of the wireless portable device that detects disarming of the security system by a user under duress through the user interface, captures information of an environment of the wireless portable device from the GPS and one or more of the camera and microphone and sends the captured information to another wireless portable device through the wireless interface.

10. The system as in claim 9 further comprising a plurality of portable devices each including a wireless interface with the security system and each able to arm and disarm the security system through a respective wireless interface.

11. The system as in claim 9 wherein the wireless portable device further comprises a processor that disarms the security system through a wireless interface with the security system based upon an input through the user interface.

12. The system as in claim 10 further comprising a display processor that provides a disarming alert on a user interface of at least some of the plurality of portable devices.

13. The system as in claim 12 wherein the alert displayed on the user interface further comprises a softkey that forwards the alert to a central monitoring station of the security system.

14. The system as in claim 12 wherein the disarming alert further comprises an image of the user disarming the security system and a location of the user.

15. The system as in claim 14 further comprising a face recognition processor that matches the image of the user with images of authorized users.

16. The system as in claim 15 further comprising a processor displaying a name of the recognized user on the disarming alert.

17. The system as in claim 9 further comprising a processor that detects the duress via a personal identification number of the user.

18. The system as in claim 15 further comprising a plurality of personal identification numbers of the user where use of one of the plurality of identification number indicates duress.

19. A system comprising:

a security system;

a plurality of wireless portable devices each with a wireless interface that arms and disarms the security system and each of the plurality of wireless portable devices having a user interface, a camera, a microphone and a global positioning system (GPS); and a processor of each of the wireless portable devices that detects disarming of the security system by a user under duress, captures information of an environment of the wireless portable device from the GPS and from one or more of the camera and microphone and sends the captured information to another of the plurality of wireless portable devices or a central monitoring station of the security system through the wireless interface.

20. The system as in claim 19 further comprising a duress detection processor that detects duress through one of the user interface and the camera.

* * * * *